United States Patent [19]

Kroontje

[11] Patent Number: 4,559,471
[45] Date of Patent: Dec. 17, 1985

[54] DEVICE PROVIDED WITH A EVACUATED BULB COMPRISING A GETTER AND A GETTER AUXILIARY MEANS

[75] Inventor: Wiggert Kroontje, Eindhoven, Netherlands

[73] Assignee: U.S. Philips Corporation, New York, N.Y.

[21] Appl. No.: 478,923

[22] Filed: Mar. 25, 1983

[30] Foreign Application Priority Data

Apr. 28, 1982 [NL] Netherlands .......................... 8201750

[51] Int. Cl.⁴ .......................... H01J 7/18; H01J 35/20; H01J 61/26
[52] U.S. Cl. .................................... 313/553; 313/562; 313/481; 252/181.6
[58] Field of Search ............... 313/548, 549, 553, 481, 313/562; 252/181.2, 181.3, 181.6; 417/48, 51

[56] References Cited

U.S. PATENT DOCUMENTS

| | | | |
|---|---|---|---|
| 3,896,042 | 7/1975 | Anderson et al. | 252/181.6 X |
| 3,926,832 | 12/1975 | Barosi | 252/181.6 |
| 4,305,017 | 12/1981 | Kuus et al. | 313/557 |
| 4,405,487 | 9/1983 | Harrah et al. | 252/181.7 X |
| 4,440,737 | 4/1984 | Libowitz et al. | 252/181.6 X |

Primary Examiner—David K. Moore
Assistant Examiner—K. Wieder
Attorney, Agent, or Firm—Norman N. Spain

[57] ABSTRACT

In devices provided with an evacuated bulb in which is present an activated metallic getter, hydrocarbons can be released or produced. As a result, the gas pressure and the heat conductivity increase. In devices according to the invention, for example, low-pressure sodium vapour discharge lamps, solar collectors, display tubes and image intensifiers, a getter auxiliary means is provided. The auxiliary means comprises an inorganic porous carrier charged with a transition metal having an atomic number from the series 23 to 29, 41 to 47 and 73 to 79, in elementary form or in oxide form, or with a combination of at least two of the said materials.

7 Claims, 4 Drawing Figures

DEVICE PROVIDED WITH A EVACUATED BULB COMPRISING A GETTER AND A GETTER AUXILIARY MEANS

The invention relates to a device provided with an evacuated bulb in which are present an activated metallic getter and an auxiliary means for the getter. Such a device is known from the Dutch Patent Application No. 7907220 (PHN 9584) which corresponds to U.K. Patent Application No. 80200861.

The known device is a low-pressure metal vapour discharge lamp, in which a discharge tube is arranged in the evacuated bulb. Current supply wires are passed in a vacuum-tight manner through the wall of the evacuated bulb and the wall of the discharge tube to a pair of electrodes arranged in this tube. In the evacuated space there is provided an electric resistor included in the current circuit of the discharge tube and serving as a getter auxiliary means and a barium layer vapour-deposited on the wall of the evacuated bulb and serving as a getter.

It is of great importance for the efficiency of this discharge lamp, for example, a low-pressure sodium vapour discharge lamp, that the vacuum around the discharge tube is maintained in order to avoid losses due to heat conduction. Like, for example, titanium, barium is capable of bonding a large number of gases, which may be released during the life of the lamp or which are left behind after the evacuation. Such gases are: $H_2$, $O_2$, $H_2O$, $CO$, $CO_2$ and $N_2$. For this purpose, also other activated getters, such as zirconium aluminium and zirconium nickel, may be used. However, these getters are not capable of binding hydrocarbon. Hydrocarbon can be present as an impurity on components of the lamp. However, it is also possible that hydrocarbon is formed at the surface of the getter from carbon, produced during binding of Co or $CO_2$, and hydrogen or water.

The getters are activated by heating them during the manufacture of the device. Vapour-deposited metal layers of barium or titanium are then formed after evaporation of the metal from a holder, in which it is released by reduction of a compound. With non-evaporated getters, adsorbed gases diffuse to the interior upon activation of the getter surface, as a result of which a clean reactive surface is obtained.

In the known lamp, the getter auxiliary means used is an electric resistor, which during operation of the lamp has a temperature between 500° and 2000° C. and disintegrates hydrocarbon into carbon and hydrogen. The hydrogen formed is bonded by the getter.

The known getter auxiliary means has the disadvantage that it consumes energy and further that, when it is connected in series with the discharge tube, it involves the risk of the lamp extinguishing prematurely if the resistor burns through.

The invention has for its object to provide a device having a getter auxiliary means which does not consume electrical energy and is active at lower temperatures.

According to the invention, in a device of the kind mentioned in the opening paragraph this is achieved in that the getter auxiliary means comprises an inorganic porous carrier which is charged with at least one transition metal having an atomic number from the series 23 to 29, 41 to 47 and 73 to 79, in elementary form or in oxide form, or with a combination of at least two of the said materials.

Experiments have shown that this getter auxiliary means readily disintegrates hydrocarbon, such as methane, at comparatively low temperatures of 300° to 350° C. or lower. Particularly Rh, Pd, Pt and their oxides proved to be very active. The mechanism, which plays a part therein, cannot be fully explained, but it has been found that the gaseous reaction products which are released are bonded by the getter. The temperature at which the getter auxiliary means is operative are strongly dependent upon its composition. In many compositions, the getter auxiliary means is operative at considerably lower temperatures than the said temperatures, while in certain compositions it is even operative at room temperature. This dependence will be apparent from the embodiments.

These relatively low to very low temperatures at which the getter auxiliary means is operative render it possible to choose for a device type a getter auxiliary means which is operative at the temperature the device exhibits during its operation in the region of the getter auxiliary means. The device may be a low-pressure metal vapour discharge lamp, but may alternatively be a display tube, an image intensifier or a solar collector.

The inorganic porous carrier may be of different types, for example, alumina, active carbon, or alumina-silica. The carrier may be charged by impregnating it with an aqueous solution of a salt or an oxide comprising the metal concerned. The carrier is then dried and, if desired, heated. Metal oxide may be converted into metal in a reducing medium, for example, in hydrogen.

As an aqueous impregnating agent, a solution of metal nitrate has proved particularly suitable, just like solutions of ammonium salts of acids derived from the metals concerned, such as ammonium metavanadate, ammonium tungstate.

The getter auxiliary means may be in the form of powder, for example, in a holder pervious to gas. However, the getter auxiliary means may alternatively consist of tablets or pills, which may be accommodated in a holder, As a holder, use may be made, for example, of a metal strip in which a cavity is formed in which the getter auxiliary means is accommodated. Alternatively, the holder may consist of a helically wound wire. It may be recommendable to provide the getter auxiliary means so as to be enclosed in an evacuated holder, which is opened after evacuation and sealing of the evacuated bulb of the device (for example, the solar collector). This has the advantage that the getter auxiliary means is screened from impurities which are released upon evacuation of the device and can be drawn off by the vacuum pump. Satisfactory results were obtained with getter auxiliary means which were enclosed in an evacuated nickel sleeve which was opened by means of a laser after evacuation of the device.

Experimentally-determined data of a large number of getter auxiliary means are indicated in Table I. The getter auxiliary means were provided in all cases in a quantity of 300 mg in an elongate glass bulb having a volume of 400 ml. The bulb was evacuated to a residual pressure of $10^{-2}$ Pa. From a holder arranged in the bulb barium was evaporated, which deposited as a layer on the wall of the bulb spatially separated from the getter auxiliary means. Methane was introduced into the bulb until a pressure of 1 Pa was attained. The auxiliary means was heated to the temperature indicated in Table I by a furnace arranged to surround the glass bulb locally. The pressure in the bulb was measured by means of a heat conduction pressostat and recorded by a recorder. Besides data about the getter auxiliary means, its temperature, the speed of its reaction with methane and the time required to attain a pressure of $10^{-2}$ Pa are indicated in the Table I.

TABLE I

| Carrier | Charged with | | T (°C.) | k (ml/s) | t |
|---|---|---|---|---|---|
| $Al_2O_3$ | $Fe_2O_3$ | 20% | 350 | $1.4 \times 10^{-2}$ | 37 h |
| $Al_2O_3$ | $Cr_2O_3$ | 15% | 350 | $3.3 \times 10^{-2}$ | 16 h |
| $Al_2O_3$ | CoO | 5% | 350 | $7.4 \times 10^{-3}$ | 69 h |
| $Al_2O_3$ | NiO | 5% | 350 | $1.7 \times 10^{-2}$ | 30 h |
| $Al_2O_3$ | CuO | 11% | 350 | $5.7 \times 10^{-1}$ | 54 min |
| $Al_2O_3$ | PdO | 1% | 150 | $3.5 \times 10^{-1}$ | 1.5 h |
| $Al_2O_3$ | $MnO_2$ | 1% | 350 | $2.0 \times 10^{-2}$ | 26 h |
| $Al_2O_3$ | $Ag_2O$ | 1% | 350 | $6.0 \times 10^{-3}$ | 85 h |
| $Al_2O_3$ | $Re_2O_7$ | 1% | 350 | $1.9 \times 10^{-2}$ | 27 h |
| $Al_2O_3$ | $WO_3$ | 1% | 350 | $3.1 \times 10^{-2}$ | 16 h |
| $SiO_2/Al_2O_3$ (6/91 W/W) | PdO | 1% | 100 | $1.2 \times 10^{-2}$ | 43 h |
| $SiO_2/Al_2O_3$ (53/45 W/W) | PdO | 1% | 150 | $2.8 \times 10^{-1}$ | 1.8 h |
| $Al_2O_3$ | Ni | 60% | 350 | $9 \times 10^{-1}$ | 34 min |
| C | Pt | 1% | 350 | >5 | <6 min |
| $Al_2O_3$ | Pt | 0,5% | 200 | $2.5 \times 10^{-1}$ | 2.0 h |
| $Al_2O_3$ | Pd | 0,2% | 250 | 2.5 | 12 min |
| $Al_2O_3$ | Pd | 0,5% | 150 | 1.85 | 17 min |
| $Al_2O_3$ | Pd | 0,5% | 100 | $9.7 \times 10^{-2}$ | 5.3 h |
| $Al_2O_3$ | Rh | 1% | 150 | $3.8 \times 10^{-1}$ | 1.3 h |
| C | Ir | 1,2% | 300 | $2.2 \times 10^{-2}$ | 23 h |
| $Al_2O_3$ | Ru | 1% | 300 | $2.0 \times 10^{-1}$ | 2.4 h |

% = % by weight

Identical experiments were carried out with alumina, which was first charged with 0.5% by weight of Pt and subsequently with the oxides indicated in Table II. The results of these experiments are stated in Table II.

TABLE II

| Charged with 1% by weight of | T (°C.) | k (ml/s) | t |
|---|---|---|---|
| CuO | 150 | $1.6 \times 10^{-1}$ | 3.2 h |
| PdO | 150 | 3.7 | 8 min |
| PdO | 100 | 1.8 | 17 min |
| NiO | 200 | $7.6 \times 10^{-1}$ | 40 min |
| $Re_2O_7$ | 100 | 1.09 | 28 min |
| $MnO_2$ | 100 | $2.9 \times 10^{-1}$ | 1.8 h |
| $Rh_2O_3$ | 22 | 4.4 | 7 min |

These experiments deviate from common practice in so far that in practice methane will not often be present to a pressure of 1 Pa. The experiments show that even such extreme quantities are bonded effectively.

The experiments covered acomparatively large low-temperature range (22°-350° C.). It is clear that the getter auxiliary means can each be used at another temperature than those stated in the Tables: i.e. at lower temperatures at which the reaction speed will be lower and at higher temperatures at which higher speeds will be attained. In a number of cases, the activation energy was determined. A value of aproximately 75 kJ/mol was then found in all cases. Examples of the preparation of a getter auxiliary means are as follows:

(1) $SiO_2/Al_2O_3$ pellets ($SiO_2/Al_2O_3$ weight ratio=53/45) were immersed in a 0.1 molar palladium nitrate solution. After 24 hours, the superntant liquid was decanted. The pellets were dried by heating them in 3 hours to 110° C. and then heating them for 2 hours at 220° C. and for 2 hours at 500° C. in iair.

(2) The getter auxiliary means of Example 1 was heated for 1 hour in hydrogen at 500° C. $SiO_2/Al_2O_3$ pellets charged with palladium were then obtained.

Examples of devices are as follows:

(1) Low-pressure sodium vapour discharge lamps were tested in a comparison test. In a first series of lamps, only a barium getter was provided in the evacuated space between the discharge vessel and the outer bulb. In a second series of lamps, there was also provided a getter auxiliary means in this space. The getter auxiliary means consisted of 35 mg of $Al_2O_3$ charged with 0.5% by weight of Pt. It was accommodated in a helically wound tungsten wire arranged at the area of the electrodes between the limbs of the U-shaped discharge vessel. The temperature in situ during operation amounted to 260° C.

The lamp voltage $V_1$, the power W and the efficiency 1 m/W were measured at the beginning of the experiment and after 100 operating hours. The results are stated in Table III.

TABLE III

| Series | t(hr) | $V_1$ | W | 1 m/W |
|---|---|---|---|---|
| 1 | 0 | 233 | 178,3 | 180,8 |
|  | 100 | 237 | 182,5 | 176,9 |
| 2 | 0 | 233 | 178,4 | 181,8 |
|  | 100 | 227 | 173,2 | 181,2 |

In the lamps without getter auxiliary means, after 100 operating hours the lamp voltage and the power consumption have increased and the efficiency has decreased. In the lamps with a getter auxiliary means (series 2), the lamp voltage and power consumption have decreased while the efficiency has remained substantially unchanged.

(2) Low-pressure sodium vapour discharge lamps having a nominal power of 90 W were provided with the same getter and getter auxiliary means as the said lamps of series 2. After evacuation, the outer bulb was provided with $CH_4$ to a pressure of 1 Pa. The lamps were operated for 10 hours. Subsequently, it was ascertained with the aid of a mass spectrometer that the $CH_4$ pressure was less than $3.10^{-4}$ Pa.

(3) Solar collectors were manufactured in two series: a first series provided with a barium getter and a second series which, apart from the presence of a getter auxiliary means, was identical to the first series. The getter auxiliary means consisted of $Al_2O_3$ charged with 0.5% by weight of Pt and 1% by weight of PdO, having a weight of 40 mg. The getter auxiliary means was provided in an initially sealed evacuated nickel tube.

The solar collectors were irradiated with visible light for 16 hours without being cooled. Subsequently, their power was measured. In the collectors of series 2, the holder of the getter auxiliary means was then opened with the aid of a laser.

The solar collectors were again irradiated for 16 hours without being cooled. Subsequently, their power was measured. An energy flow of 1000 W/m² was used in all cases, which corresponds to the flow of solar energy on a sunny summer day. The results are stated in Table IV.

TABLE IV

| Series | Measurement | Power |
|---|---|---|
| 1 | 1 | 60,8 |
|  | 2 | 61,0 |
| 2 | 1 | 61,0 |
|  | 2 | 63,5 |

These results show a power increase of approximately 4% after the holder of the getter auxiliary means has been opened, whereas in the reference case the power has remained substantially unchanged.

Embodiments of devices in accordance with the invention are shown in the drawings. In the drawings.

Figure 1:
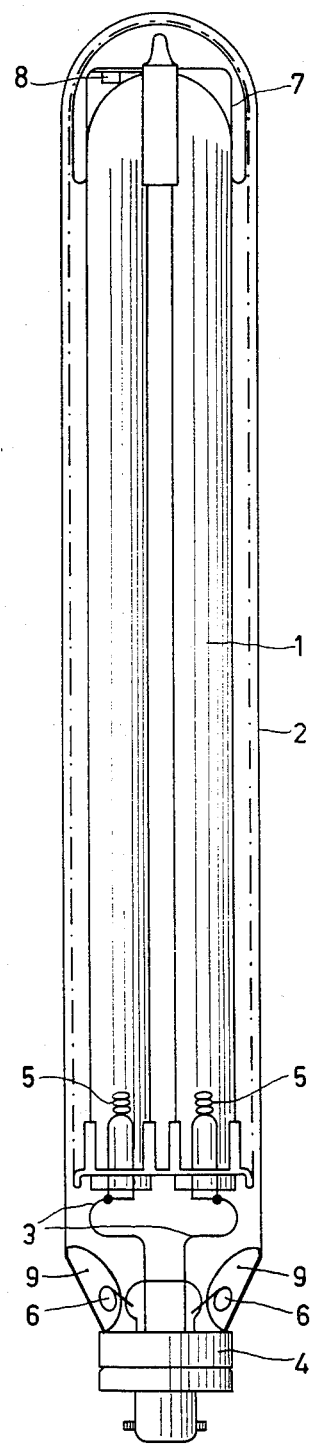
FIG. 1 is a side elevation of a low-pressure sodium vapour discharge lamp.

In FIG. 1, a discharge vessel 1 is arranged in an evacuated bulb 2. Current supply conductors 3 extend from a lamp cap 4 to electrodes 5 arranged in the discharge vessel. Barium has been evaporated from holders 6 and is deposited as a thin layer 9 on the inner wall of the bulb 2. The discharge vessel 1 is held in a centred position in the bulb 2 by a spring 7. This spring has secured to it a holder 8 in which a greater auxiliary means is provided. The getter auxiliary means is an inorganic porous carrier charged with an oxide of a transition metal having an atomic number from the series 23 to 29, 41 to 47 and 73 to 79.

Figure 2:
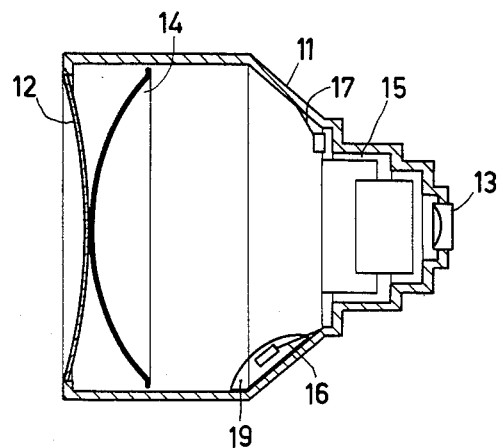
FIG. 2 is a schematic representation of an image intensifier.

In FIG. 2, an evacuated bulb 11 has an entrance window 12 and an exit window 13 to which a fibre-optical system can be coupled. A CsI screen is designated by 14 and an electron-optical system is denoted by 15. From a holder 16 titanium has been evaporated and has deposited as a thin layer 19. In a holder 17, a getter auxiliary means is arranged consisting of a porous inorganic carrier charged with platinum and rhodium oxide.

Figure 3:
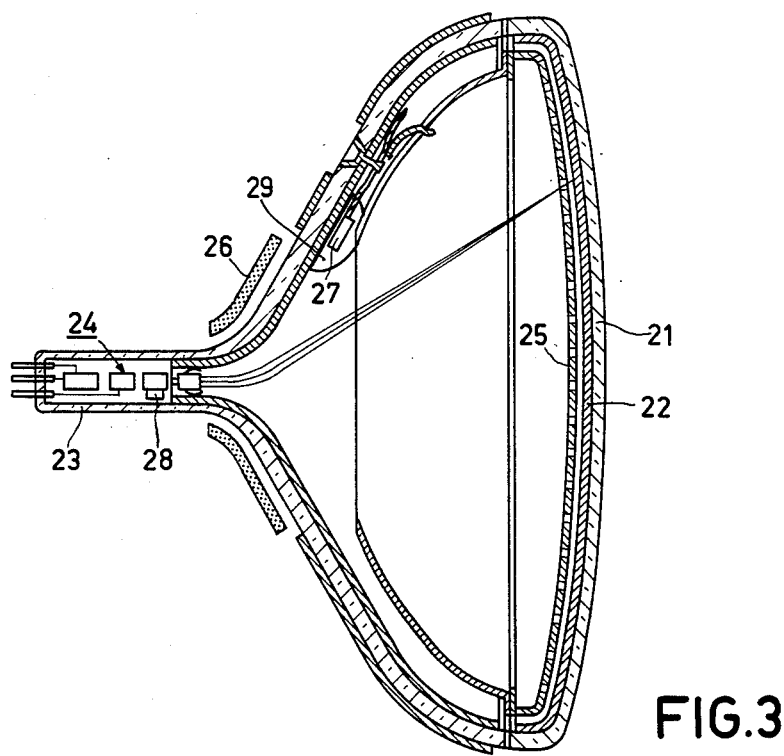
FIG. 3 is an axial sectional view of a display tube.

In FIG. 3, a display tube has an evacuated bulb 21, a wall portion of which is provided with a display screen 22. A neck-shaped part 23 accommodates an electrode system 24, while a colour selection electrode 25 is present near the display screen 22. Deflection coils 26 are arranged to surround the tube. The wall of the bulb 21 has secured to it a holder 27, from which barium has been vapour-deposited as a layer 29 on the wall of the bulb after evacuation of the bulb. The electrode system 24 has secured to it a holder 28, in which a porous carrier charged with cupric oxide is present as getter auxiliary means.

Figure 4:
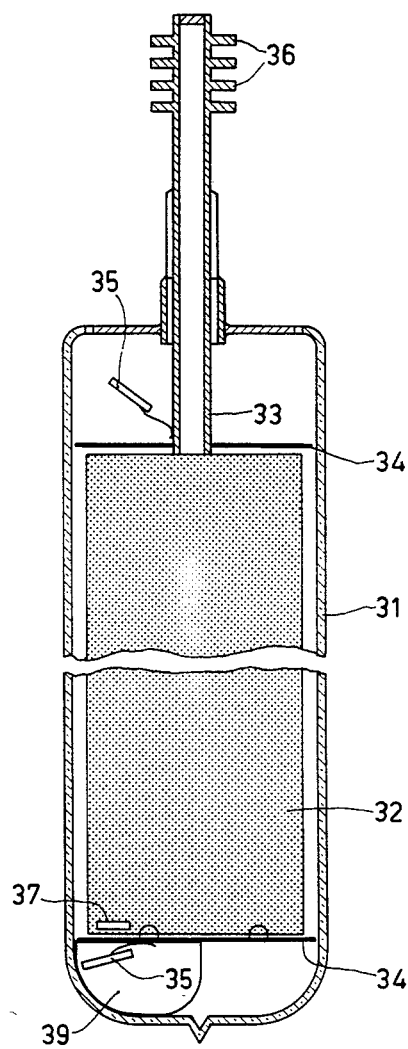
FIG. 4 is an axial sectional view of a solar collector.

In FIG. 4, there is arranged in an evacuated glass bulb 31 an absorber 32 which is secured to a tube 33, which is filled with a heat-transporting agent. The tube 33 is passed in a vacuum-tight manner through the wall of the bulb 31 to the exterior and is provided in situ at its end with a heat exchanger 36. The absorber 32 is held in a centred position in the bulb 31 by plates 34, which also prevent for the major part that barium evaporating from the holder 35 and forming a thin layer 29 is deposited opposite the absorber 32 on the wall of the bulb 31. On the absorber 32 there is secured a nickel sleeve 37, in which a getter auxiliary means is arranged which consists of alumina charged with $Pt/Re_2O_7$.

What is claimed is:

1. A device provided with an evacuated bulb in which bulb there are present as activated metallic getter and an auxiliary means for the getter, characterized in that the auxiliary means is capable of disintegrating methane at a temperature of 350° C. and comprises an inorganic porous carrier charged with at least one transition metallic material selected from the group consisting of rhodium, copper, platinum, palladium and oxides thereof.

2. The device of claim 1 wherein the carrier is charged with a combination of at least two of said transition metal materials.

3. The device of claim 1 wherein the auxiliary means is charged with platinum plus an oxide selected from the group consisting of palladium oxide and rhodium oxide.

4. A device as claimed in claim 1 wherein the device is a low-pressure sodium vapour discharge lamp.

5. A device as claimed in claim 1 wherein the device is a solar collector.

6. A device provided with an evacuated bulb in which bulb there are present an activated metallic getter and an auxiliary means for said getter characterized in that said auxiliary means for said getter is spaced apart from said getter, is capable of disintegrating methane at a temperature of 350° C. and comprises an inorganic porous carrier impregnated with at least one transition metal material selected from the group of elements of atomic numbers 23 to 29, 41 to 47 and 73 to 79 inclusive and oxides thereof.

7. The device of claim 6 wherein the transition metal material is selected from the group consisting of Fe, Cr, Ni, Cu, Co, Pd, Mn, Ag, Re, W, Pt, Rh, Ir, and Ru and mixtures thereof.

* * * * *

UNITED STATES PATENT AND TRADEMARK OFFICE
CERTIFICATE OF CORRECTION

PATENT NO. : 4,559,471
DATED : December 17, 1985
INVENTOR(S) : WIGGERT KROONTJE

It is certified that error appears in the above-identified patent and that said Letters Patent is hereby corrected as shown below:

In the Claims:

Column 6, line 14, "as" should be --an--.

Signed and Sealed this

Twelfth Day of August 1986

[SEAL]

Attest:

Attesting Officer

DONALD J. QUIGG

Commissioner of Patents and Trademarks